US008972178B2

(12) United States Patent
Windeler et al.

(10) Patent No.: US 8,972,178 B2
(45) Date of Patent: Mar. 3, 2015

(54) METHOD OF USING A COMPUTING DEVICE TO IDENTIFY AN OCCUPIED PARKING SPOT

(71) Applicants: Joshua G Windeler, Grand Blanc, MI (US); Patrick Minjeur, Rochester Hills, MI (US); Jonathan M Rener, Troy, MI (US); Ross S Maunders, Clarkston, MI (US)

(72) Inventors: Joshua G Windeler, Grand Blanc, MI (US); Patrick Minjeur, Rochester Hills, MI (US); Jonathan M Rener, Troy, MI (US); Ross S Maunders, Clarkston, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 174 days.

(21) Appl. No.: 13/690,027

(22) Filed: Nov. 30, 2012

(65) Prior Publication Data

US 2014/0156183 A1 Jun. 5, 2014

(51) Int. Cl.
*G01C 21/00* (2006.01)
*G08G 1/14* (2006.01)

(52) U.S. Cl.
CPC .................................... *G08G 1/144* (2013.01)
USPC ........................................................ 701/454

(58) Field of Classification Search
None
See application file for complete search history.

(56) References Cited

U.S. PATENT DOCUMENTS 5,432,508 A 7/1995 Jackson
5,980,185 A 11/1999 Vita
6,107,942 A 8/2000 Yoo et al.
6,240,365 B1 5/2001 Bunn
6,266,609 B1 7/2001 Fastenrath
6,340,935 B1 1/2002 Hall
6,501,391 B1 12/2002 Racunas, Jr.
6,507,777 B1 1/2003 Pinlam et al.
6,832,206 B1 12/2004 Chelnik
7,834,778 B2 11/2010 Browne et al.
7,899,583 B2 3/2011 Mendelson
8,583,360 B2 * 11/2013 Waters et al. ................. 701/400
2002/0099574 A1 7/2002 Cahill et al.
2005/0085257 A1 * 4/2005 Laird et al. ................. 455/550.1
2006/0180647 A1 8/2006 Hansen
2007/0050240 A1 * 3/2007 Belani et al. ..................... 705/13
2009/0187342 A1 * 7/2009 Vavrus et al. ................. 701/210
2011/0022427 A1 1/2011 Dayan
2011/0133957 A1 6/2011 Harbach et al.
2011/0285591 A1 11/2011 Wong
2012/0072311 A1 * 3/2012 Khan ......................... 705/26.81
2012/0130777 A1 5/2012 Kaufman
2012/0136997 A1 5/2012 Yan et al.
2013/0257604 A1 * 10/2013 Mirle et al. ................ 340/425.5

* cited by examiner

*Primary Examiner* — Thomas Tarcza
*Assistant Examiner* — Adam Alharbi
(74) *Attorney, Agent, or Firm* — Ralph E. Smith

(57) ABSTRACT

Techniques are disclosed for reporting occupied and unoccupied parking spaces are disclosed. The techniques include determining that a mobile computing device has entered a parking area and determining whether the mobile computing device has entered a pedestrian mode. The pedestrian mode is indicative of a user of the mobile computing device parking a vehicle and exiting the vehicle. When the mobile computing device has entered the pedestrian mode, the technique includes determining a first location of the mobile computing device at a first time corresponding to the mobile computing device entering the pedestrian mode, and providing an occupied notification to a remote computing device, the occupied notification including the first location and indicating that a parking spot corresponding to the first location is occupied. Techniques are further disclosed for reporting unoccupied parking spaces to the mobile computing device.

15 Claims, 7 Drawing Sheets

METHOD OF USING A COMPUTING DEVICE TO IDENTIFY AN OCCUPIED PARKING SPOT

FIELD

The present disclosure relates to techniques for locating available parking spots. In particular, the present disclosure relates to techniques for reporting occupied and available parking spots to a parking server from a mobile computing device and for providing locations of available parking spots to a mobile computing device from the parking server.

BACKGROUND

As can be appreciated by most drivers, lack of available parking spots can be a frustrating experience. Drivers must randomly drive through a parking area in the hopes of coming across an available parking spot. During times of peak traffic, the driver may waste a significant amount of time driving around the parking area until an available parking spot can be located. There have been attempts to automate the process of finding a parking spot, but these attempts have focused on the use of sensors located in each of the parking spots or the use of video cameras to identify available parking spots. The cost associated with retrofitting parking areas with such technology can be extraordinary and, therefore, may be infeasible.

SUMMARY

According to some embodiments of the present disclosure, a method is disclosed for reporting whether a parking spot is occupied. The method includes determining that the mobile computing device has entered a parking area and determining whether the mobile computing device has entered a pedestrian mode. The pedestrian mode is indicative of a user of the mobile computing device parking a vehicle and exiting the vehicle. When the mobile computing device has entered the pedestrian mode, the method further includes determining a first location of the mobile computing device at a first time corresponding to the mobile computing device entering the pedestrian mode, and providing an occupied notification to a remote computing device, the occupied notification including the first location and indicating that a parking spot corresponding to the first location is occupied.

According to some embodiments of the present disclosure, a method is disclosed for providing a mobile device with a set of available parking spots. The method includes receiving a request for available parking from a mobile computing device at a first time, the request including a current location of the mobile computing device. The method further includes obtaining a set of available parking spots within a vicinity of the current location. Each available parking spot in the set of available parking indicates a location of the available parking spot and has a timestamp associated therewith, the timestamp being indicative of a time when the available parking spot was reported as being available. The method further includes, for each available parking spot of the set of available parking spots determining a score of the available parking spot based on the first time and the timestamp, and providing the location of the available parking spot and a score indicator of the available parking spot to the mobile computing device. The score is indicative of a degree of likelihood that the available parking spot remains available and the score indicator is indicative of the score of the available parking spot.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
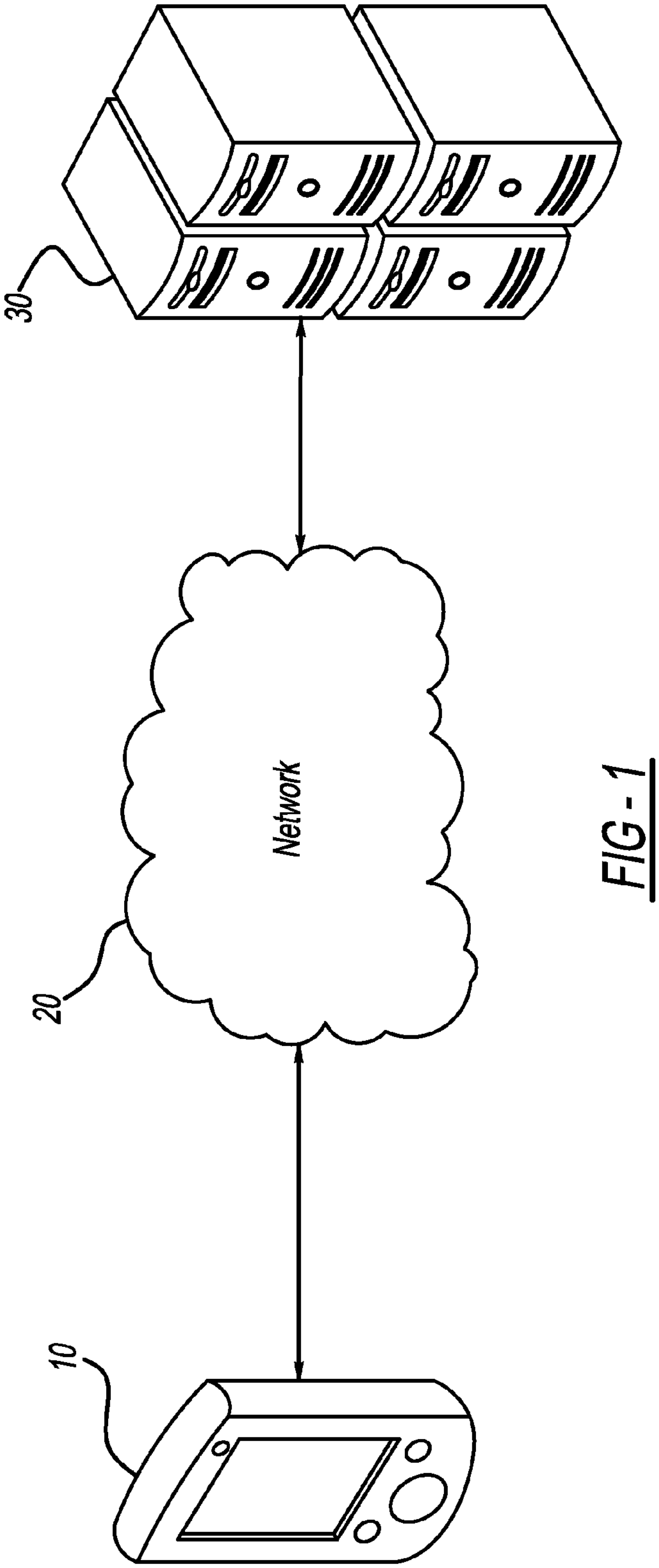
FIG. 1 is a schematic illustrating an example of a mobile computing device in communication with a parking server in accordance with some embodiments of the present disclosure.

Referring now to FIG. 1, an example of a mobile computing device 10 in communication with a parking server 30 via a network 20 is depicted. As used herein, the term "mobile computing device" can refer to, but is not limited to, a cellular telephone, a smartphone, a tablet computer, a laptop computer, and a personal digital assistant (PDA). The term "network" can refer to any suitable communication network, including, but not limited to, a wireless network, a cellular network, an intranet, the Internet, and combinations thereof. Furthermore, while a single parking server 30 is shown, the term "parking server" may include two or more servers that operate in either an individual or distributed manner.

In the illustrative embodiment, the mobile computing device 10 is configured to report recently available and recently occupied parking spots in a parking area to a parking server 30. As used herein, the term "parking area" can refer to any geographic area known to have one or more parking spots, e.g., parking lots and streets that allow public parking, and the term "parking spots" can refer to specific locations in the parking area designated for parking. Furthermore, the available and occupied parking spots that are reported by the mobile computing device 10 are parking spots that have been made available or occupied by a vehicle corresponding to a user of a mobile computing device 10.

The mobile computing device 10 is further configured to request available parking from the parking server 30. The parking server 30 receives the request, which can include a current location of the mobile computing device 10, and determines a set of available parking spots within the vicinity of the mobile computing device 10. The parking server 30 provides the locations of each of the set of available parking spots to the mobile computing device 10. The mobile computing device 10 can receive the locations of the available parking spots and display the locations in, for example, a map.

Furthermore, in some embodiments, the parking server 30 can provide a score and/or an indicator of a score for each of the available parking spots. As will be described further below, the score can be indicative of a degree of likelihood that the available parking spot is still available, which is based on an amount of time that has lapsed since the parking lot was reported as being available. For example, parking spots that were identified as being available more recently, e.g., less than ten minutes, have higher scores than parking spots that were identified as being available less recently, e.g., more than one hour. In these embodiments, the mobile computing device 10 can display the available parking spots in the map with an indicator of the score. For instance, the mobile computing device 10 can display available parking spots with higher scores in green and available parking spots with lower scores in red. In this way, a user of the mobile computing device 10 can attempt to find parking in parking spots that are displayed in green over parking spots that are displayed in red.

Figure 2:
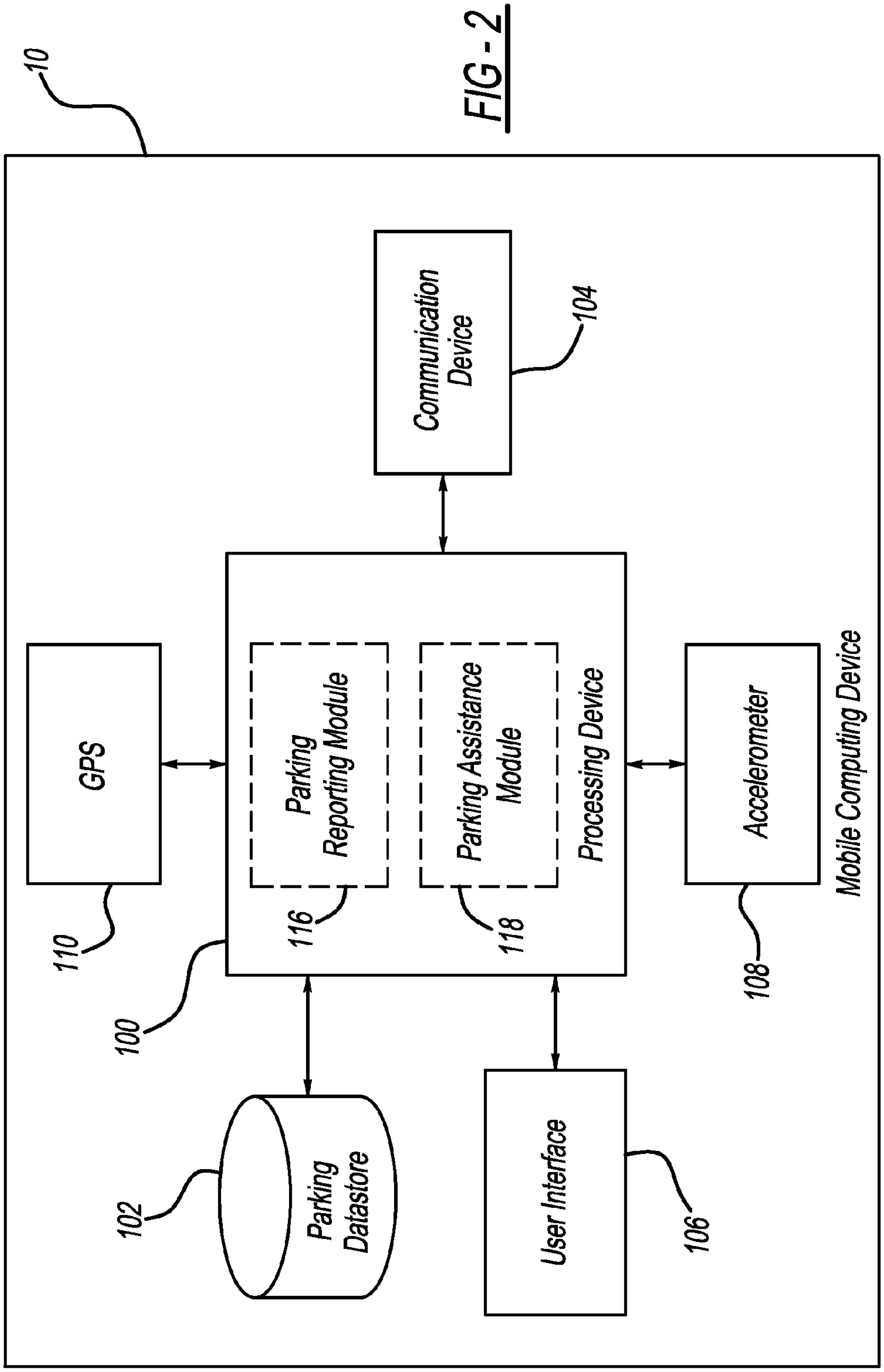
FIG. 2 is a schematic illustrating exemplary components of the mobile computing device of FIG. 1.

Referring now to FIG. 2, an example embodiment of a mobile computing device 10 is depicted. In the illustrative embodiment, the mobile computing device 10 includes a processing device 100, a parking datastore 102, a communication module 104, a user interface 106, an accelerometer 108, and a global positioning system (GPS) 110. It should be appreciated that the exemplary mobile computing device 10 can include additional components.

In an exemplary embodiment, the processing device 100 includes memory storing computer-executable instructions and one or more processors that execute the computer-executable instructions. In embodiments where the processing device 100 includes two or more processors, the processors may operate in a distributed, shared, or individual manner. The processing device 100 can execute the operating system of the mobile computing device 10 and other processes. In the exemplary embodiment, the processing device 100 executes a parking reporting module 116 and a parking assistance module 118, the functionalities of which are described in further detail below.

In exemplary embodiments, the communication device 104 includes one or more transceivers that allow the mobile computing device 10 to communicate with another device, e.g., parking server 30, over the network 20. For example, the communication device 104 can include one or more wireless transceivers configured to communicate using the IEEE 802.11 protocol and/or one or more cellular transceivers configured to communicate using the various mobile telecommunication standards, e.g., 3G or 4G. It should be appreciated that in some embodiments, the communication device 104 may further include wired communication ports which allow wire-line communication with another device.

The user interface 106 includes one or more devices that allow a user to interact with the mobile computing device. For example, the user interface 106 can include one or more of a touchscreen display, a display device, a touchpad, a partial QWERTY keyboard, a microphone, and/or one or more speakers. The user interface 106 allows a user to provide requests to find available parking and to display a map of a parking area to the user.

In the exemplary embodiment, the GPS 110 receives signals from a plurality of satellites to determine a geographic location of the mobile computing device 10. The geographic location output by the GPS 110 can be in the form of GPS coordinates, e.g., (Longitude, Latitude). The accelerometer 108 is a device that outputs an accelerometer signal that is indicative of the acceleration of the mobile computing device 10. The accelerometer signal can be output in the form of an acceleration vector, <x, y, z> containing three components, a first amount of acceleration in a first direction, e.g., x-axis acceleration, a second amount of acceleration in a second direction, e.g., y-axis acceleration, and a third amount of acceleration in a third direction, e.g., z-axis acceleration.

In the illustrative embodiment, the parking datastore 102 stores the location of the vehicle when the vehicle is parked in a parking spot. In some embodiments, the parking datastore 102 further stores the locations of known parking areas. For example, the location of a parking area may be represented by a boundary of the parking area, the boundary being represented by a set of GPS coordinates defining the outer edges of the boundary. The parking datastore 102 may also maintain a cache of available parking spots that have been provided to the mobile computing device 10. The parking datastore 102 can be implemented on a memory device of the mobile computing device 10, e.g., a hard disk drive or a flash memory device.

As mentioned, the processing device 100 executes the parking reporting module 116. In exemplary embodiments, the parking reporting module 116 monitors the location, speed, and/or acceleration of the mobile computing device 10 to determine whether a parking spot is available or occupied. In some embodiments, the parking reporting module 116 monitors the speed and acceleration of the mobile computing device 10 to determine when the mobile computing device 10 enters and exits a "pedestrian mode." As used herein, the term "entering a pedestrian mode" can refer to a situation when the mobile computing device 10 can infer that a user of the mobile computing device 10 has stopped traveling in a vehicle and has exited the vehicle. Similarly, the term "exiting a pedestrian mode" can refer to a situation when the mobile computing device 10 can infer that the user has entered a vehicle and started traveling in the vehicle, e.g., speed of mobile computing device 10 is greater than a speed threshold.

When the parking reporting module 116 determines that the mobile computing device 10 has entered the pedestrian mode, the parking reporting module 116 can record the geographic location where the mobile computing device 10 entered the pedestrian mode and can provide an "occupied notification" to the parking server 30. As used herein, the term "occupied notification" can refer to any communication from the mobile computing device 10 to the parking server 30 which indicates that a parking spot corresponding to the location at which the mobile computing device 10 entered the pedestrian mode is occupied by a vehicle. The occupied notification may include the location at which the mobile computing device 10 entered the pedestrian mode.

Figure 3:
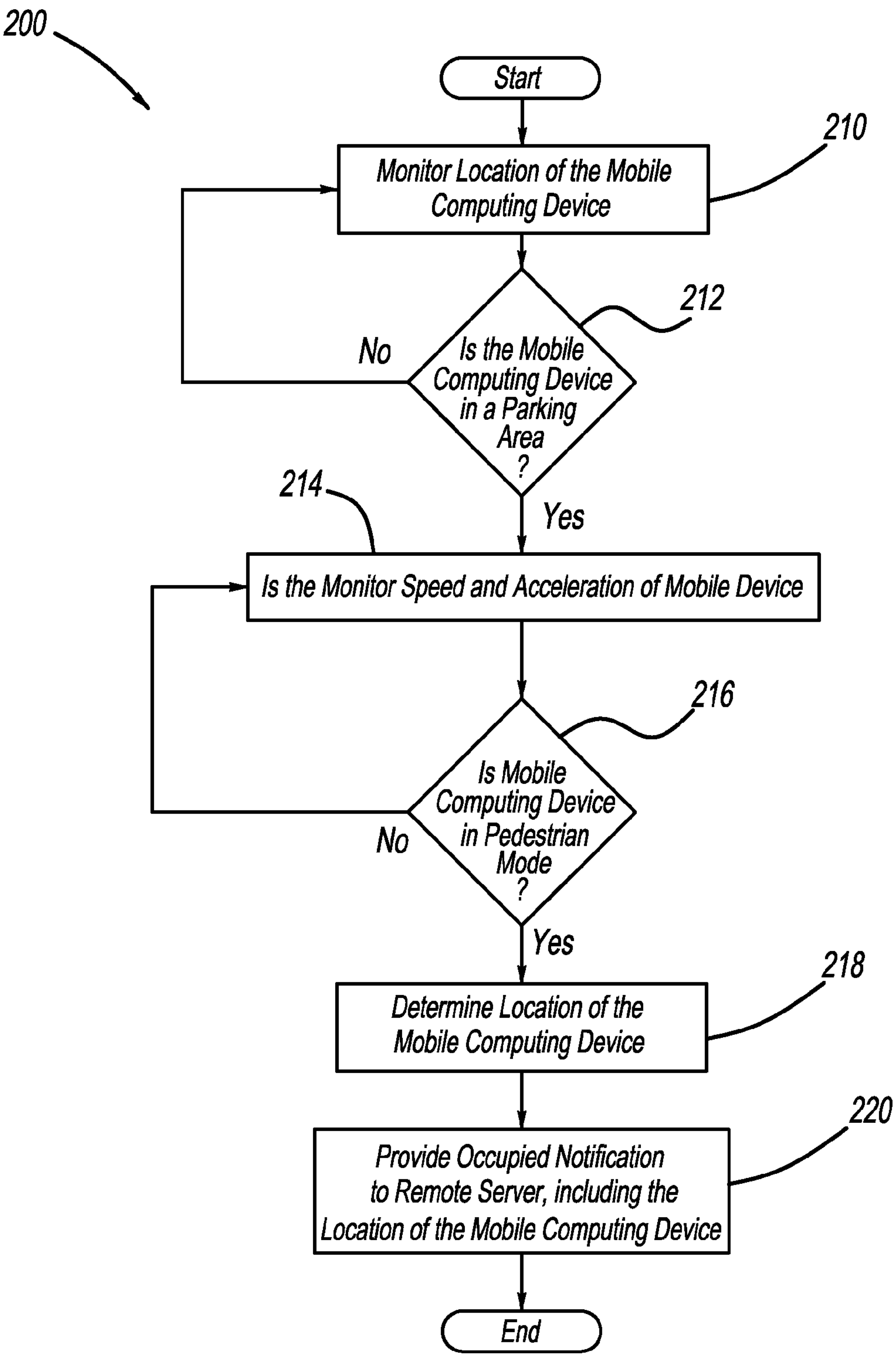
FIG. 3 is a flow chart illustrating a method for reporting an occupied parking spot to the parking server of FIG. 1 according to some embodiments of the present disclosure

FIG. 3 illustrates an example method 200 for reporting an occupied parking spot to the parking server 30. In the illustrative embodiment, the method 200 is executed by the parking reporting module 116. It should be appreciated, however, that the method may be executed by any other suitable component.

At operation 210, the parking reporting module 116 monitors the location of the mobile computing device 10. For example, the parking reporting module 116 can obtain the GPS coordinates of the mobile computing device 10 from the GPS 110. At operation 212, the parking reporting module 116 determines whether the mobile computing device 10 is in a known parking area. In some embodiments, the parking reporting module 116 compares the obtained GPS coordinates with the known parking areas stored in the parking datastore 102. If the mobile computing device 10 is not in a known parking area, the parking reporting module 116 can continue monitoring the location of the mobile computing device 10 until the mobile computing device 10 enters a known parking area.

When the parking reporting module 116 determines that the mobile computing device 10 has entered a known parking area, the parking reporting module 116 monitors the speed and acceleration of the mobile computing device 10, as shown at operation 214. The speed of the mobile computing device 10 can be determined from the accelerometer 108 and/or the GPS 110. The acceleration of the mobile computing device 10 can be determined from the accelerometer.

At operation 216, the parking reporting module 116 determines whether the mobile computing device 10 has entered a pedestrian mode based on the speed and the acceleration of the mobile computing device 10. In some embodiments, the parking reporting module 116 can analyze the speed and acceleration for a particular sequence. For instance, the parking reporting module 116 can monitor the speed of the mobile computing device 10 waiting for the speed of the mobile computing device 10 to reach zero miles per hour (mph). In some embodiments, the parking reporting module 116 determines that the mobile computing device 10 has reached zero mph if the speed of the mobile computing device is consecutively sampled at zero mph for a predetermined number of samples, e.g. 5 consecutive samples. Once the speed of the mobile computing device 10 reaches zero mph, the parking reporting module 116 analyzes the acceleration of the mobile computing device 10 to determine whether the movement of the mobile computing device 10 is consistent with the motion of exiting a vehicle. For example, the parking reporting module 116 can compute a magnitude of the acceleration of the mobile computing device 10. In some embodiments, the magnitude of the acceleration can be computed according to:

$$a=\sqrt{x^2+y^2+z^2} \tag{1}$$

where x is the magnitude of the acceleration in the x-axis, y is the magnitude of the acceleration in the y-axis, and z is the magnitude of the acceleration in the z-axis. If the magnitude of the acceleration exceeds a predetermined acceleration threshold, e.g., 12 meters per second per second (m/s/s), the parking reporting module 116 determines that the mobile computing device 10 has entered a pedestrian mode, as the combination of the speed of the mobile computing device reaching zero mph and the magnitude of the acceleration exceeding the predetermined acceleration threshold is indicative of a vehicle parking in a parking spot and the user of the mobile computing device 10 exiting the vehicle. It should be appreciated that the parking reporting module 116 can determine whether the mobile computing device has entered the pedestrian mode in other suitable manners. Furthermore, the parking reporting module 116 can request that the user provide explicit confirmation that the user has parked his or her vehicle when the speed of the mobile computing device 10 reaches 0 mph. If neither negative nor positive confirmation is received, then the parking reporting module 116 can determine the magnitude of the acceleration.

If the mobile computing device 10 has not entered the pedestrian mode, the parking reporting module 116 continues to monitor the speed and acceleration of the mobile computing device until the mobile computing device enters the pedestrian mode. If the mobile computing device 10 has entered the pedestrian mode, the parking reporting module 116 obtains a location of the mobile computing device from the GPS 110, as shown at operation 218. The location corresponds to where the mobile computing device 10 entered the pedestrian mode and can be stored in the parking datastore 102. At operation 220, the parking reporting module 116 can provide an occupied notification to the parking server 30. The occupied notification includes the location of the mobile computing device determined at operation 218.

The method 200 of FIG. 3 is provided for example only and not intended to be limiting. Variations of the method 200 are contemplated and within the scope of the disclosure. Furthermore, not all of the operations are required and additional operations may be performed during the execution of the method 200.

Referring back to FIG. 2, the parking reporting module 116 may be further configured to report an available parking spot in the form of an "available notification" when the parking reporting module 116 determines the mobile computing device 10 has exited the pedestrian mode at a location that approximately matches the location where the mobile computing device 10 previously entered the pedestrian mode. The term "available notification" can refer to any communication from the mobile computing device 10 to the parking server 30 which indicates that a parking spot corresponding to the location at which the mobile computing device 10 exited the pedestrian mode is available. The available notification may include the location at which the mobile computing device 10 exited the pedestrian mode.

Figure 4:
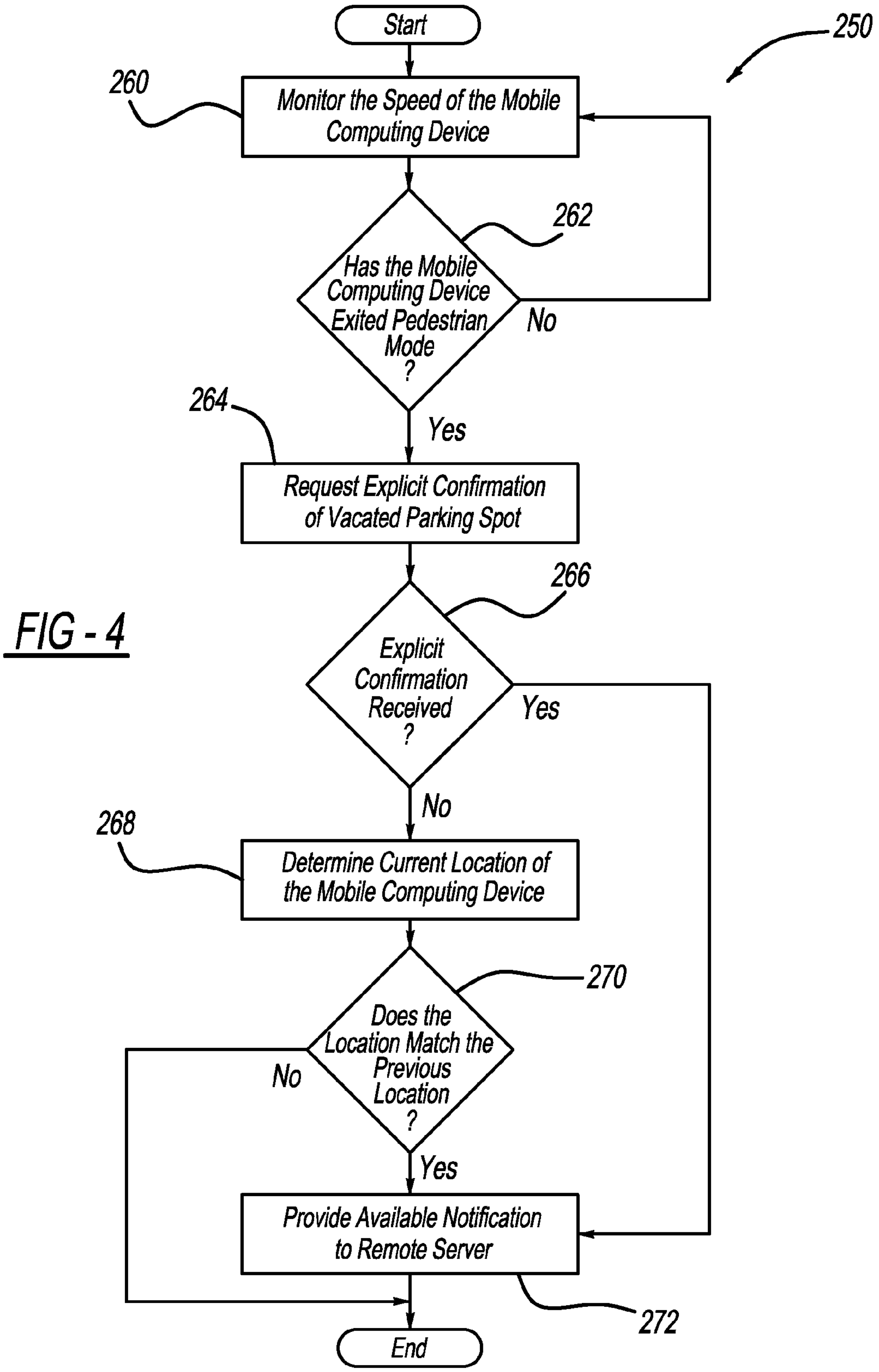
FIG. 4 is a flow chart illustrating a method for reporting an available parking spot to the parking server of FIG. 1 according to some embodiments of the present disclosure.

FIG. 4 illustrates an example method 250 for reporting an available parking spot to the parking server 30. The method 250 can be executed by the parking reporting module 116 while the mobile computing device 10 is in a pedestrian mode. At operation 260, the parking reporting module 116 monitors the speed of the mobile computing device 10. At operation 262, the parking reporting module 116 determines whether the mobile computing device 10 has exited the pedestrian mode. In some embodiments, the parking reporting module 116 makes the determination that the mobile computing device 10 has exited the pedestrian mode when the speed of the mobile computing device 10 exceeds a predetermined threshold, e.g., 7 mph. If the mobile computing device 10 has exited the pedestrian mode, the parking reporting module 116 can execute operation 264. Otherwise, the parking reporting module 116 continues to monitor the speed of the mobile computing device 10.

At operation 264, the parking reporting module 116 provides a request to the user asking for explicit confirmation of a vacated parking spot via the user interface 106. If explicit confirmation is received, the parking reporting module 116 provides an available notification to the parking server 30. In this scenario, as the user has provided explicit confirmation that a parking spot is available, the parking reporting module 116 can provide the location stored in the parking datastore 204 in the available notification. If explicit confirmation is not received, the parking reporting module 116 determines the current location of the mobile computing device 10, as shown at operation 268.

At operation 270, the parking reporting module 116 determines whether the current location matches the previous location, i.e., the location when the mobile computing device 10 last entered the pedestrian mode. Operation 270 is performed to ensure that when the mobile computing device 10 is exiting the pedestrian mode, it is doing so at the same location at which it entered the pedestrian mode. Put another way, operation 270 confirms that the mobile computing device 10 is leaving the same parking spot that was previously reported as being occupied. Thus, if the current location does not match or approximately match the previous location the parking reporting module 116 does not send an available notification to the parking server 30. If, however, the locations match or approximately match the parking reporting module 116 provides an available notification to the remote server. As used herein, the term "approximately match" can refer to a situation where the two locations are within a predetermined distance from one another, e.g., 2 meters. It is noted that the available notification can include the current location or the previous location stored in the parking datastore 102.

The method 250 of FIG. 4 is provided for example only and not intended to be limiting. Variations of the method 250 are contemplated and are within the scope of the disclosure. Furthermore, not all of the operations are required and additional operations may be performed during execution of the method 250. For instance, in some embodiments, the parking reporting module 116 does not request explicit confirmation of a vacated parking spot from the user.

Referring back to FIG. 2, the parking assistance module 118 displays a graphical user interface (GUI) which allows a user of the mobile computing device 10 to request locations of available parking spots from the parking server 30. In some embodiments, at the request of the user, the parking reporting module 116 provides a request for available parking to the parking server 30. The request can include the current location of the mobile computing device 10. The parking server 30 can respond to the request by providing one or more locations of available parking spots. In response to receiving the locations of available parking spots, the parking assistance module 118 presents a map of the parking area and the locations of the available spots within the parking area. The map can be presented in the user interface 106.

Figure 5:
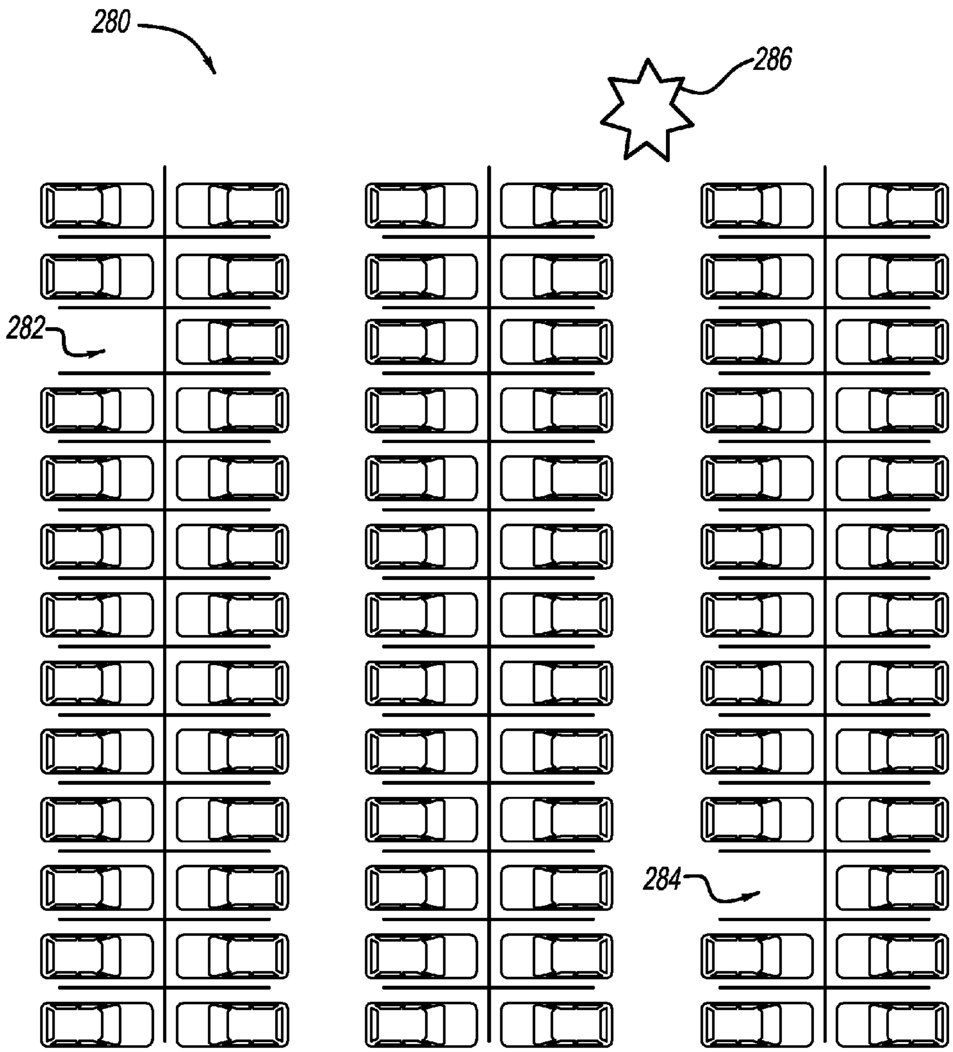
FIG. 5 is a schematic illustrating an example map that can be displayed by the mobile computing device of FIG. 1 to show available parking spots.

Referring now to FIG. 5, an example of a map of a parking area 280 that is displayed by the parking assistance module 118 via the user interface 106 is illustrated. In the illustrated example, the parking assistance module 118 has received locations of two available parking spots, e.g. parking spot 282 and 284. In the illustrated example, the current location of the mobile computing device 10 is indicated by star 286. Thus, the parking assistance module 118 is displaying the current location of the mobile computing device 10 and the location of the available parking spots 282 and 284. Accordingly, the user of the mobile computing device 10 can drive his or her vehicle to one of the available parking spots. Once the user parks in an available parking spot, e.g., parking spot 284, the mobile computing device 10 may report parking spot 284 as being occupied, and parking spot 284 may be reported as an occupied parking spot to other mobile computing devices 10.

The example of FIG. 5 is provided for example only. It should be appreciated that the available parking spots 282 and 284 may be imparted to the user in any other suitable manner.

In some embodiments, the parking assistance module 118 also receives score indicators corresponding to each of the locations. A score indicator corresponding to a given available parking spot is indicative of a degree of likelihood that the given parking spot remains available. For example, a parking spot that was recently reported as available, e.g., two minutes prior to a request, is more likely to still be available than a parking spot that was reported as available less recently, e.g., half an hour prior to the request. Thus, the more recently reported available parking spot has a higher score than the less recently reported available parking spot. Based on the score indicators, the parking assistance module 118 can display the available parking spots in accordance with their respective score indicators. For example, available parking spots having relatively high scores can be displayed in green, while parking spots having relatively low scores can be displayed in red. It should be appreciated that other means of displaying the score indicators of the available parking spots can also be implemented. Furthermore, a score indicator can be a numerical value (a score) or a code representing a range of numerical values (a range of scores).

In some embodiments, the parking assistance module 118 stores the location at which the mobile computing device 10 entered the pedestrian mode in the parking datastore 102. In these embodiments, the mobile computing device 10 can provide the location of a parked vehicle to the user if the user is unable to locate the parked vehicle. For example, the mobile computing device 10 can display the location of the user's parking spot in the map of FIG. 5.

Figure 6:
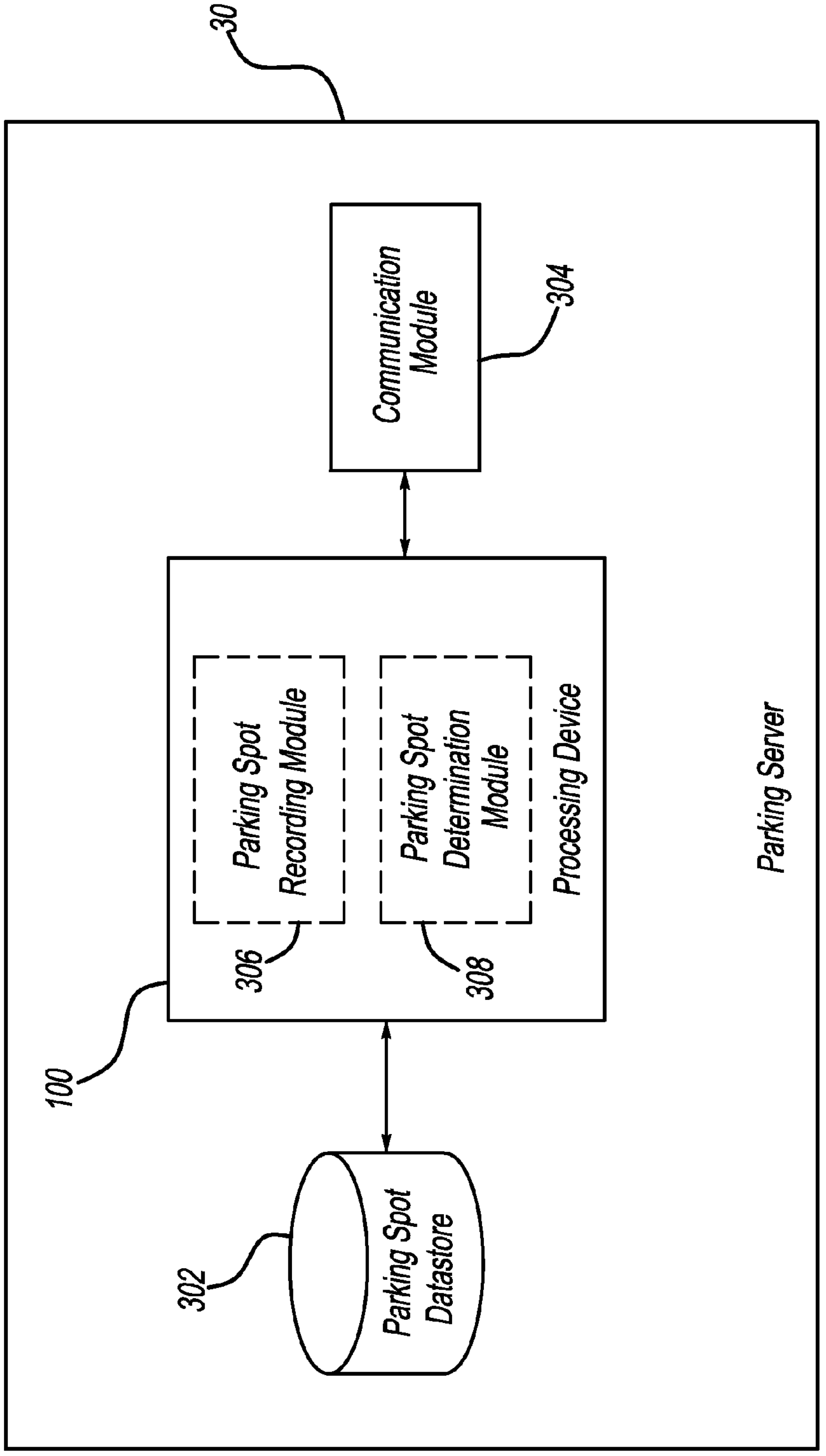
FIG. 6 is a schematic illustrating exemplary components of the parking server of FIG. 1.

Referring now to FIG. 6, an example embodiment of the parking server 30 is illustrated. The parking server 30 may include a processing device 300, a parking spot datastore 302, and a communication module 304.

The processing device 300 includes memory storing computer-executable instructions and one or more processors that execute the computer-executable instructions. In embodiments where the processing device 300 includes two or more processors, the processors may operate in a distributed, shared, or individual manner. The processing device 300 can execute the operating system of the parking server 30. In the exemplary embodiment, the processing device 300 executes a parking spot recording module 306 and a parking spot determination module 308.

In some embodiments, the parking spot datastore 302 maintains a database that stores the locations of one or more known parking areas, and for each known parking area, locations of one or more parking spots located in the parking area. For each parking spot, the parking spot datastore 302 also stores a status indicating whether the parking spot is available or occupied. In some embodiments, the parking spot datastore 302 may also store a timestamp for each parking spot indicating when the parking spot was reported as being available or occupied. It should be appreciated, however, that the parking spot datastore 302 may be organized in other suitable formats.

The parking spot recording module 306 receives occupied and available notifications from many different mobile computing devices and maintains the parking spot datastore 302 based on the received notifications. When the parking spot recording module 306 receives an available notification, the parking spot recording module 306 determines the location of the available parking spot from the notification and changes the status of the parking spot to "available." Further, in some embodiments, the parking spot recording module 306 obtains a timestamp corresponding to when the available notification was received and relates the timestamp to the available parking spot in the parking spot datastore 302.

Similarly, when the parking spot recording module 306 receives an occupied notification, the parking spot recording module 306 determines the location of the occupied parking spot from the notification and changes the status of the parking spot to "occupied." In some embodiments, the parking spot recording module 306 obtains a timestamp corresponding to when the occupied notification was received and relates the timestamp to the occupied parking spot in the parking spot datastore 302.

The parking spot determination module 308 receives a request for available parking from a mobile computing device 10 and provides a locations corresponding to a set of available parking spots in the vicinity of the mobile computing device 10. Furthermore, the parking spot determination module 308 determines a score for each of the available parking spots based on the timestamp corresponding thereto.

Figure 7:
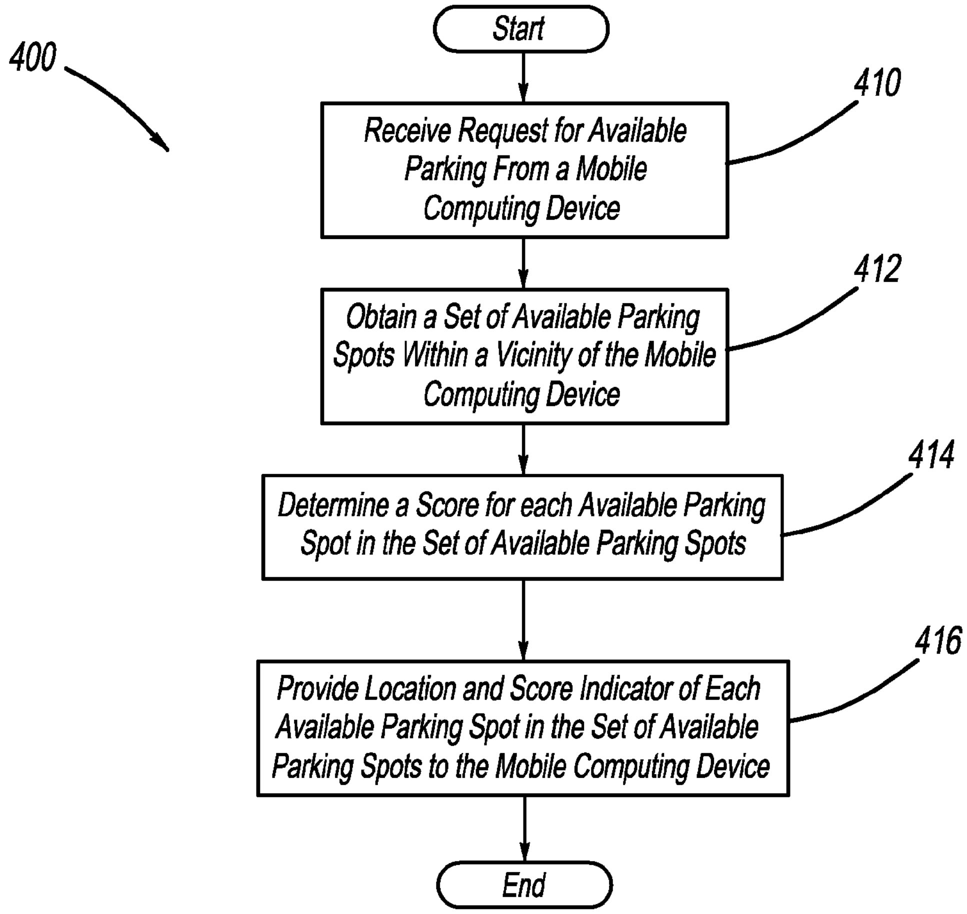
FIG. 7 is a flow chart illustrating a method for providing a set of available parking spots to a mobile computing device of FIG. 1.

Referring now to FIG. 7, a method 400 for providing a set of available parking spots to a mobile computing device 10 is illustrated. In the illustrated example, the method 400 is executed by the parking spot determination module 308. At operation 410, the parking spot determination module 308 receives a request for available parking from a mobile computing device 10. The request can include a current location of the mobile computing device 10.

At operation 412, the parking spot determination module 308 obtains a set of available parking spots within the vicinity of the mobile computing device 10. In some embodiments, the parking spot determination module 308 identifies the parking area in which the mobile computing device 10 is currently located. The parking spot determination module 308 then identifies all of the available parking spots in the identified parking area. In other embodiments, the parking spot determination module 308 identifies any available parking spots within a predetermined distance, e.g., 300 meters, from the current location of the mobile computing device 10. The identified available parking spots are included in the set of available parking spots.

At operation 414, the parking spot determination module 308 determines a score for each of the available parking spots in the set of available parking spots. As discussed, the score of an available parking spot is indicative of a degree of likelihood that the parking spot is available given the amount of time that has lapsed since the parking spot was reported as being available. As can be appreciated, the longer a parking spot has been reported as being "available" the more likely the parking spot has since been occupied by another vehicle (presumably one that does not report the existence of occupied/available parking spots). Thus, the parking spot determination module 308 uses the timestamp associated with an available parking spot to determine the amount of time that has lapsed since the parking spot was reported as being available, e.g., the difference between the current time and the time indicated in the timestamp. Based on the amount of time that has lapsed, the parking spot determination module calculates the score of the available parking spot. In some embodiments, the parking spot determination module 308 uses a decay function to calculate the score the available parking spot. For example, the parking spot determination module 308 can calculate the score of the available parking spot according to following scoring function:

$$\text{Score} = \frac{1}{\Delta T} \quad (2)$$

where Score is the score of the available parking spot and ΔT is the amount of time that has lapsed.

In some embodiments, the scoring function can be adjusted to take into account factors that affect the availability of parking. For example, the score of an available parking spot may be calculated according to the following scoring function:

$$\text{Score} = \frac{1}{\Delta T^P} \quad (3)$$

where P can be varied depending on various factors. For example, P can be 1 in ordinary conditions, but P can be increased during the holiday season, during weekends, or evenings. Similarly, P can be reduced during the early hours of the morning. Furthermore, P can be defined differently for different parking areas. As more information is learned about the parking area, P can be adjusted by a human or learned over time using various machine learning techniques. It is noted that the score of an available parking spot can be determined in any other suitable manner.

At operation 416, the parking spot determination module 308 provides the location and a score indicator of each available parking spot in the set of available parking spots to the mobile computing device 10. The score indicator can be the actual numerical score of the available parking spot or a value or code that identifies a range of scores to which the score of the available parking spot belongs, e.g., low, medium, or high.

The method 400 of FIG. 7 is provided for example only and not intended to be limiting. Variations of the method 400 contemplated and are within the scope of the disclosure. Furthermore, not all of the operations are required and additional operations may be performed during the execution of the method 400.

It is noted that in some embodiments, the parking spot determination module 308 can be further configured to determine scores of occupied parking spots. In these embodiments, the parking spot determination module 308 can determine a score of an occupied parking spot based on a timestamp indicating when the parking spot was reported as being unavailable. When a parking spot has been reported as being occupied for a relatively long time, e.g., more than 24 hours, it is likely that the vehicle that was occupying the parking spot left the spot but did not report the spots availability. Thus, the parking spot determination module 308 can be further configured to report scores of occupied parking spots when the score of an occupied parking spot indicates that it is has likely been vacated since it was last reported as being occupied.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:

determining, at a processing device of a mobile computing device, that the mobile computing device has entered a parking area;

determining, at the processing device, whether the mobile computing device has entered a pedestrian mode, the pedestrian mode being indicative of a user of the mobile computing device parking a vehicle and exiting the vehicle; and when the mobile computing device has entered the pedestrian mode:

determining, at the processing device, a first location of the mobile computing device at a first time corresponding to the mobile computing device entering the pedestrian mode, and providing, at the processing device, an occupied notification to a remote computing device, the occupied notification including the first location and indicating that a parking spot corresponding to the first location is occupied;

wherein determining whether the mobile computing device has entered a pedestrian mode includes monitoring, at the processing device, a speed of the mobile computing device at predetermined intervals and determining, at the processing device, whether the mobile computing device is in the pedestrian mode based on the speed; and wherein the mobile computing device is in the pedestrian mode when the sampled speed is equal to zero for more than a predetermined amount of time.

2. The method of claim 1, wherein determining whether the mobile computing device has entered the pedestrian mode further includes:

monitoring, at the processing device, an accelerometer signal generated by the mobile computing device, the accelerometer signal being indicative of an acceleration of the mobile computing device and a direction of acceleration;

determining, at the processing device, a magnitude of the acceleration of the mobile computing device based on the accelerometer signal;

wherein the mobile computing device is determined to be in the pedestrian mode when the sampled speed equal to zero for more than a predetermined amount of consecutive samples and the magnitude is greater than a magnitude threshold after the predetermined amount of time.

3. The method of claim 2, wherein the acceleration and the direction of the acceleration are represented by an acceleration vector, $<x, y, z>$, where x is a first amount of acceleration in a first direction, y is a second amount of acceleration in a second direction, and z is a third amount of acceleration in a third direction, and wherein the first direction, the second direction, and the third direction are all orthogonal to one another.

4. The method of claim 3, wherein the magnitude is calculated according to:

$$A=\sqrt{x^2+y^2+z^2} \quad (1)$$

where A is the magnitude.

5. The method of claim 1, further comprising:

determining, at the processing device, whether the mobile computing device has exited the pedestrian mode;

when the mobile computing device has exited the pedestrian mode:

determining, at the processing device, a second location of the mobile computing device at a second time corresponding to the mobile computing device exiting the pedestrian mode;

comparing, at the processing device, the second location to the first location;

providing, at the processing device, an available notification to the remote computing device when the second location approximately matches the first location, the available notification including one of the first location and the second location and indicating that the parking spot is available.

6. The method of claim 3, wherein the mobile computing device is determined to have exited the pedestrian mode when the speed of the mobile computing device exceeds a speed threshold after being determined to have been in the pedestrian mode.

7. The method of claim 1, wherein when the mobile computing device enters the pedestrian mode, the method further includes:

storing, at the processing device, the first location, wherein the storing is performed without input from a user; and providing, at the processing device, the first location for display in a map at a request of the user.

8. A method comprising:

determining, at a processing device of a mobile computing device, that the mobile computing device has entered a parking area;

determining, at the processing device, whether the mobile computing device has entered a pedestrian mode, the pedestrian mode being indicative of a user of the mobile computing device parking a vehicle and exiting the vehicle; and when the mobile computing device has entered the pedestrian mode:

determining, at the processing device, a first location of the mobile computing device at a first time corresponding to the mobile computing device entering the pedestrian mode, and providing, at the processing device, an occupied notification to a remote computing device, the occupied notification including the first location and indicating that a parking spot corresponding to the first location is occupied;

determining, at the processing device, whether the mobile computing device has exited the pedestrian mode;

when the mobile computing device has exited the pedestrian mode:

determining, at the processing device, a second location of the mobile computing device at a second time corresponding to the mobile computing device exiting the pedestrian mode;

comparing, at the processing device, the second location to the first location;

providing, at the processing device, an available notification to the remote computing device when the second location approximately matches the first location, the available notification including one of the first location and the second location and indicating that the parking spot is available.

9. The method of claim 8, wherein determining whether the mobile computing device has entered a pedestrian mode includes:

monitoring, at the processing device, a speed of the mobile computing device at predetermined intervals;

determining, at the processing device, whether the mobile computing device is in the pedestrian mode based on the speed.

10. The method of claim 9, wherein the mobile computing device is in the pedestrian mode when the sampled speed is equal to zero for more than a predetermined amount of time.

11. The method of claim 9, wherein determining whether the mobile computing device has entered the pedestrian mode further includes:

monitoring, at the processing device, an accelerometer signal generated by the mobile computing device, the accelerometer signal being indicative of an acceleration of the mobile computing device and a direction of acceleration;

determining, at the processing device, a magnitude of the acceleration of the mobile computing device based on the accelerometer signal;

wherein the mobile computing device is determined to be in the pedestrian mode when the sampled speed equal to zero for more than a predetermined amount of consecutive samples and the magnitude is greater than a magnitude threshold after the predetermined amount of time.

12. The method of claim 11, wherein the acceleration and the direction of the acceleration are represented by an acceleration vector, <x, y, z>, where x is a first amount of acceleration in a first direction, y is a second amount of acceleration in a second direction, and z is a third amount of acceleration in a third direction, and wherein the first direction, the second direction, and the third direction are all orthogonal to one another.

13. The method of claim 12, wherein the magnitude is calculated according to:

$$A=\sqrt{x^2+y^2+z^2} \quad (1)$$

where A is the magnitude.

14. The method of claim 12, wherein the mobile computing device is determined to have exited the pedestrian mode when the speed of the mobile computing device exceeds a speed threshold after being determined to have been in the pedestrian mode.

15. The method of claim 8, wherein when the mobile computing device enters the pedestrian mode, the method further includes:

storing, at the processing device, the first location, wherein the storing is performed without input from a user; and providing, at the processing device, the first location for display in a map at a request of the user.

* * * * *